Aug. 11, 1925.
W. J. PEEL
CLUTCH LEVER HOLDER
Filed Dec. 18, 1924  2 Sheets-Sheet 1
1,549,377
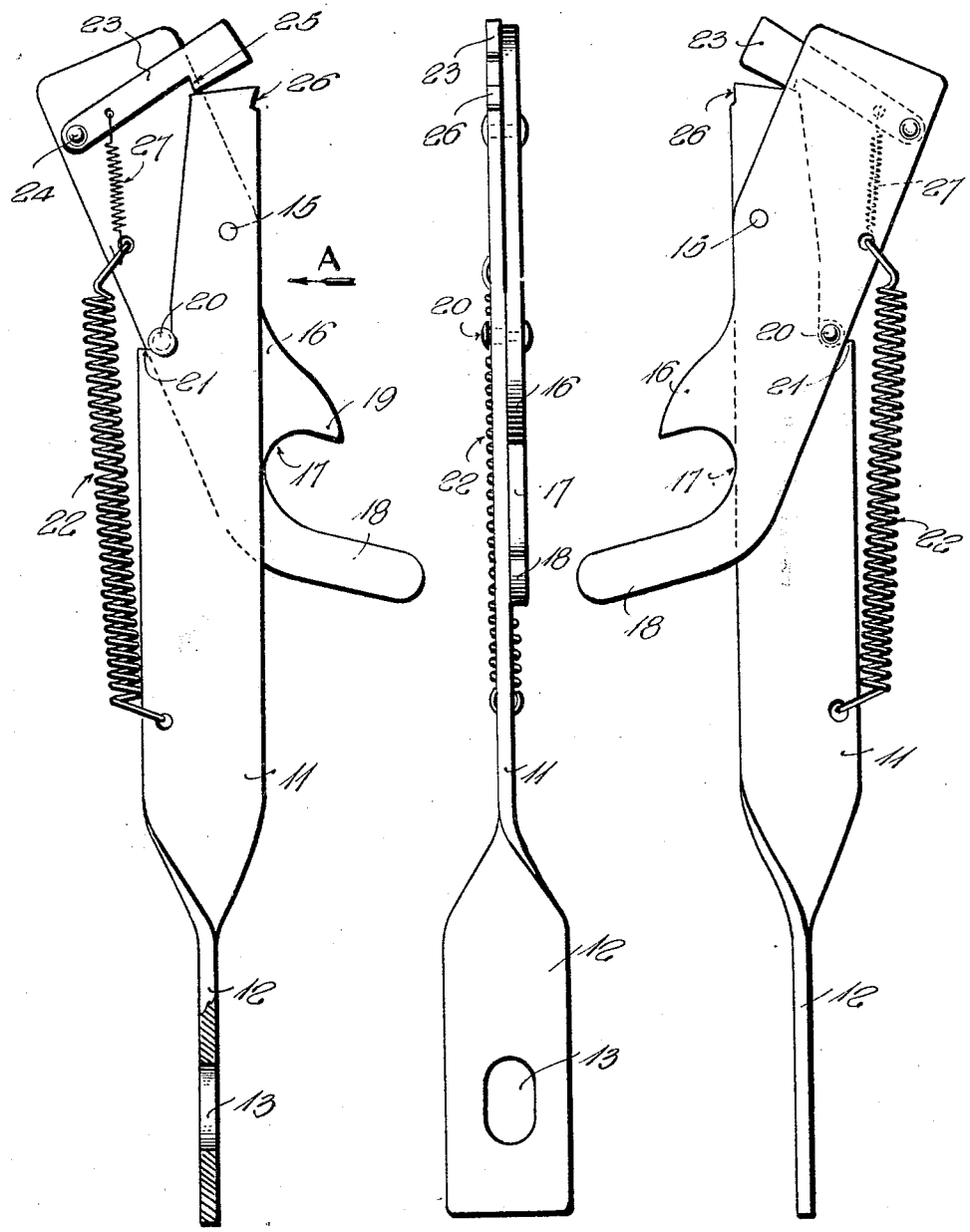

Aug. 11, 1925.
W. J. PEEL
1,549,377
CLUTCH LEVER HOLDER
Filed Dec. 18, 1924   2 Sheets-Sheet 2
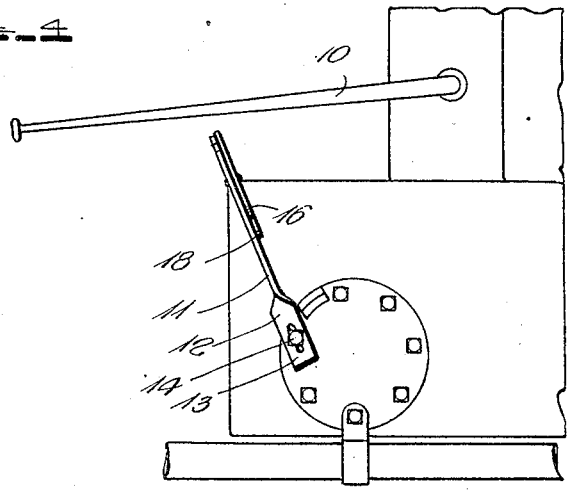
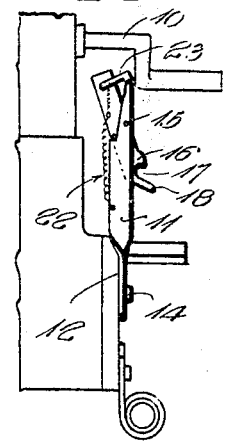
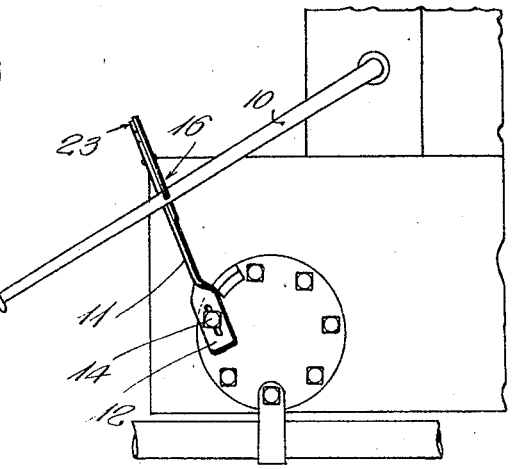
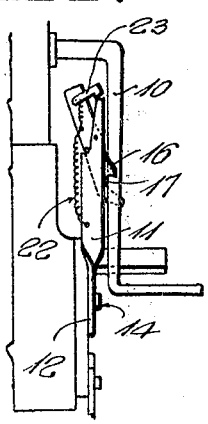
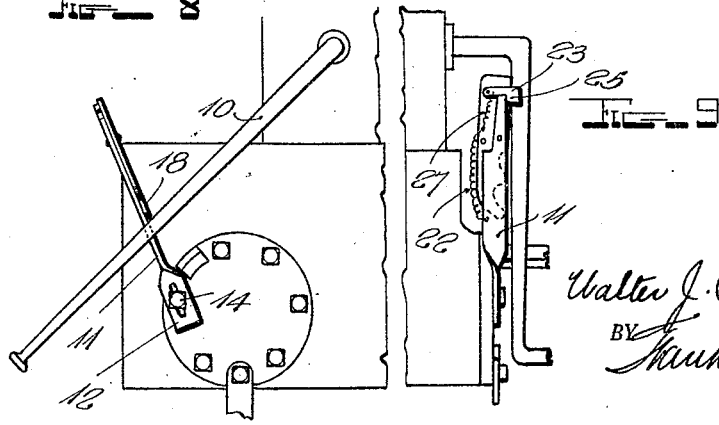
INVENTOR.
Walter J. Peel,
BY
ATTORNEY.

Patented Aug. 11, 1925.

1,549,377

UNITED STATES PATENT OFFICE.

WALTER J. PEEL, OF MILLERSBURG, MICHIGAN.

CLUTCH-LEVER HOLDER.

Application filed December 18, 1924. Serial No. 756,783.

*To all whom it may concern:*

Be it known that I, WALTER J. PEEL, a citizen of the United States of America, and resident of Millersburg, in the county of Presque Isle and State of Michigan, have invented certain new and useful Improvements in Clutch-Lever Holders, of which the following is a specification.

This invention relates to clutch lever locking and releasing devices for tractors and the like, and has for an object the provision of novel means for holding a clutch lever in position to release the clutch of tractors and the like, associated with novel means for retaining the clutch holding element in inoperative position when the clutch lever is to move to permit the clutch to operate; and it is an object of this invention to produce means which operate automatically to retain the clutch lever in the first mentioned position and it also is automatically operated to reset the clutch lever engaging element for a repetition of the operation.

It is a further object of this invention to a clutch lever holding device which can be readily attached to tractors now in common use and which comprises comparatively few inexpensive parts of simple construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a clutch lever holder with the parts in position to retain the clutch lever with the clutch inactive;

Figure 2 illustrates a view of the said device at right angles to that shown in Fig. 1, looking in the direction of arrow "A";

Figure 3 illustrates a view in elevation of the device on the side opposite that shown in Fig. 1;

Figure 4 illustrates a view in elevation of the said device in operative relation to the clutch lever;

Figure 5 illustrates a view at right angles to that shown in Fig. 4;

Figure 6 illustrates a view in elevation showing the clutch lever engaged by the retaining device;

Figure 7 illustrates a view at right angles to that shown in Fig. 6;

Figure 8 illustrates a view in elevation showing the clutch lever disconnected from the retaining device and latched in position to permit the clutch lever to oscillate upwardly to operate the clutch; and Figure 9 illustrates an edge view thereof.

The clutch lever or pedal 10 is of a type used in a well known make of tractor, and while this element is sometimes referred to as a pedal, in the further reference to it herein, it will, as heretofore in the specification, be termed a "lever."

The lever retaining and releasing device, in the present embodiment of the invention, comprises a flat standard or post 11 with its end 12 at right angles to the standard proper. The said end has an aperture 13 for receiving a bolt or the like 14, by which the standard is anchored to the transmission housing or other part of a tractor within the range of movement or oscillation of the lever 10. The standard has a pivot 15 near one edge and its upper end, on which a lever engaging plate or detent 16 is oscillatably mounted, the said pivot, in the present embodiment of the invention, being applied to the plate near its edge and approximately mid way between its ends, although this relation of parts may be changed to suit particular requirements. The plate 16 at its inner end is provided with a recess 17 forming a seat for the reception of the clutch lever, and in the formation of the said seat a finger 18 is produced at the inner extremity of the said plate, the said finger constituting a cam surface which is engaged by the lever when the lever is forced downwardly or when the clutch lever is to be released for the purpose of setting the clutch. In the formation of the recess 17, a shoulder 19 is produced which constitutes an abutment for the lever for holding the said lever in position to retain the clutch elements out of engagement and the clutch, of course, inoperative.

A stud 20 is carried by the plate 16 and it is intended, as will presently appear, to engage a shoulder 21 formed on the edge of the standard 11 opposite that occupied by the pivot 15, but the shoulder 21 is on a plane below that occupied by the said pivot. A spring 22 has one end anchored to the standard and its opposite end anchored to the plate and it is located at the edge of the standard having the shoulder 21. The spring is operative to normally pull the upper or outer end of the plate downwardly, and when the said plate is free to move, the said spring pulls the plate and causes the stud 20 to engage the shoulder 21, a condition which limits the oscillatory movement of the plate in one direction and serves to prevent the plate from releasing the clutch lever after it is located in the seat 17 until the clutch lever is maniuplated, as will presently appear.

A latch 23 is oscillatable on a pivot 24 extending from the plate 16, and the latch has a shoulder 25 which engages the edge of the standard at its upper end, it being shown that the standard is beveled, as at 26, to engage the shoulder of the latch. The latch is pulled downwardly by a spring 27, which is here shown as anchored to the latch and the spring 22, but obviously, this spring may be anchored in any appropriate way for accomplishing the result indicated, which is to cause the shoulder of the latch to engage the edge of the standard in one step of the operation of the device, as will presently appear.

Assuming that the device has been installed on a tractor in operative relation to the clutch lever, as illustrated in Figs. 4 to 9 inclusive, and assuming that the parts are in the positions illustrated in Figs. 4 and 5 and that the clutch lever is released to make the clutch operative, downward pressure on the outer end of the clutch lever will cause it to oscillate along the edge of the standard until it engages the edge of the plate 16. Further movement of the lever will cause it to ride over the cam edge 27 of the plate 16 and the said plate will be forced downwardly until the lever comes into alinement with the recess 17, at which location the spring 22 will operate to force the inner end of the plate outwardly into engagement with the clutch lever, and if the clutch lever is then released, the clutch lever will be held inactive by reason of the fact that the clutch lever and the spring 22 will force the plate into the position in which it is illustrated in Figs. 1, 6 and 7 and the clutch lever will be held against movement. Should an operator desire to release the clutch lever, he would force its outer or free end downwardly along the edge of the standard and it would engage the finger 18 and oscillate the plate 16 to a degree which would carry the end of the finger 18 to aline with the edge of the standard, in which position the latch would engage the upper end of the standard and retain the plate temporarily against movement, with the end of the latch projecting beyond the edge of the standard, as shown in Fig. 9. Then, upon releasing the clutch lever, it would, under the impulse of the spring with which it is provided in tractors of the type known, swing upwardly along the edge of the standard and disengage the latch from the standard in passing. The clutch lever would thus be free to set the clutch and the lever retaining device would be reset by the action of the spring 22 in the position in which it is illustrated in Figs. 5 and 7 and a repetition of the operation could then take place.

I claim:

1. A clutch lever holder comprising a support, a lever retaining device comprising an element pivotally mounted thereon and having an end projectable from the edge of said support into the path of travel of a clutch lever, means for moving the said element to the last mentioned position, means for limiting the movement of the said element and retaining it in the last mentioned position, the projecting end of said element having a lever receiving seat, a cam forming an extension of the element engaged by said lever in its movement to force the projecting end of the element inwardly, means carried by the said element and engaging the support for holding said element when forced inwardly while the lever moves additionally with relation to the support, the said holding device being in the path of travel of the lever and moved thereby for releasing the said element holding device and freeing the said element and permitting resetting the lever retaining device.

2. A clutch lever holder comprising a support having a shoulder, a lever retaining device comprising an element pivotally mounted thereon and having an end projectable from the edge of said support, means on said element engaging the shoulder for limiting the movement of the element in one direction, means for imparting motion to the element for moving it to the last mentioned position, the projecting end of said element having a lever receiving seat, a cam on the end of the element engaged by the lever when moved from the seat for forcing the projecting end of the element inwardly, means carried by the element engaging the support for holding the element in the last mentioned position while the lever moves independently thereof, the last mentioned means being in the path of travel of the lever and engaged thereby for disengaging said means from the support and releasing the said element and resetting the lever retaining device.

3. A clutch lever holder comprising a support having a shoulder, a lever retaining device comprising an element pivotally mounted thereon and having an end projectable from the edge of said support, means on said element engaging the shoulder for limiting the movement of the element in one direction, means for imparting motion to the element for moving it to the last mentioned position, the projecting end of said element having a lever receiving seat, a cam on the end of the element engaged by the lever when moved from the seat for forcing the projecting end of the element inwardly, a latch pivotally mounted on the element and engageable with the support for holding the element in the last mentioned position while the lever moves independently thereof, the said latch projecting into the path of travel of the lever to be moved thereby for disengaging the latch from the said support and permitting the element to be reset for engaging the lever.

WALTER J. PEEL.